United States Patent
Otsu et al.

(10) Patent No.: US 8,183,832 B2
(45) Date of Patent: May 22, 2012

(54) CHARGING SYSTEM, CHARGER, AND BATTERY PACK

(75) Inventors: Takahisa Otsu, Osaka (JP); Yoshikazu Kiyohara, Osaka (JP)

(73) Assignee: Panasonic Corporation, Osaka (JP)

( * ) Notice: Subject to any disclaimer, the term of this patent is extended or adjusted under 35 U.S.C. 154(b) by 432 days.

(21) Appl. No.: 12/527,293

(22) PCT Filed: Feb. 14, 2008

(86) PCT No.: PCT/JP2008/000223
§ 371 (c)(1),
(2), (4) Date: Aug. 14, 2009

(87) PCT Pub. No.: WO2008/102528
PCT Pub. Date: Aug. 28, 2008

(65) Prior Publication Data
US 2010/0102778 A1    Apr. 29, 2010

(30) Foreign Application Priority Data
Feb. 19, 2007    (JP) .................................. 2007-037999

(51) Int. Cl.
*H02J 7/00*    (2006.01)
*H02J 7/04*    (2006.01)
(52) U.S. Cl. .................... 320/116; 320/128; 320/162

(58) Field of Classification Search .................. 320/116, 320/162, 128
See application file for complete search history.

(56) References Cited

U.S. PATENT DOCUMENTS
6,087,810 A    7/2000    Yoshida

FOREIGN PATENT DOCUMENTS

| JP | 06-078471 | 3/1994 |
|---|---|---|
| JP | 09-121462 | 5/1997 |
| JP | 09-312172 | 12/1997 |
| JP | 11-341694 | 12/1999 |
| JP | 2002-135990 | 5/2002 |

*Primary Examiner* — M'Baye Diao
(74) *Attorney, Agent, or Firm* — McDermott Will & Emery LLP

(57) ABSTRACT

After the initial current set processing is performed, by which a feed amount of a charge current Ic by a charge current feed portion 35 is set to a first current value I1 exceeding a reference current value Ie preset as a current value of the charge current at which the charge current is flown without causing substantially any deterioration in secondary batteries 141, 142, and 143 while negative electrode potential of the secondary batteries 141, 142, and 143 has dropped to substantially 0 V, the charge current is changed in such a manner that the current value keeps decreasing with an increase of a terminal voltage Vt detected by a voltage detection portion 15 until the terminal voltage Vt detected by the voltage detection portion 15 reaches an end voltage Vf, which is the terminal voltage across a set battery 14 when the negative electrode potentials of the secondary batteries 141, 142, and 143 have dropped to substantially 0 V.

9 Claims, 5 Drawing Sheets

CHARGING SYSTEM, CHARGER, AND BATTERY PACK

RELATED APPLICATIONS

This application is the U.S. National Phase under 35 U.S.C. §371 of International Application No. PCT/JP2008/000223, filed on Feb. 14, 2008, which in turn claims the benefit of Japanese Application No. 2007-037999, filed on Feb. 19, 2007, the disclosures of which Applications are incorporated by reference herein.

TECHNICAL FIELD

The present invention relates to a charging system, a charger, and a battery pack equipped with a nonaqueous electrolyte secondary battery for charging a nonaqueous electrolyte secondary battery.

BACKGROUND ART

FIG. 4 is a view used to describe a charge operation of a secondary battery by CCCV (Constant Current Constant Voltage) charge according to the background art. FIG. 4 shows a case where a nonaqueous electrolyte secondary battery, for example, a lithium-ion secondary battery, is charged and it shows a terminal voltage Vt and a charge current Ic of the lithium-ion secondary battery and the SOC (State of Charge) of the secondary battery.

In the CCCV charge, CC (Constant Current) charge is performed first and then it is switched to CV (Constant Voltage) charge when the terminal voltage Vt across a lithium-ion secondary battery has reached an end voltage Vf, after which a charge current Ic is kept reduced so as to maintain the terminal voltage Vt at the end voltage Vf. Full charge is determined when the charge current Ic has dropped to a current value Ia and feeding of a charge current is stopped (for example, see Patent Document 1).

In the CC charge, a charge current Ic, which is a predetermined constant current I2, is fed to a nonaqueous electrolyte secondary battery as a charge current. Accordingly, the positive electrode potential Pp of the nonaqueous electrolyte secondary battery rises whereas the negative electrode Pm drops with an increase of the SOC (State of Charge).

FIG. 5 is a view showing a case where a lithium-ion secondary battery is charged to describe a relation of the SOC, the positive electrode potential Ppo and the negative electrode potential Pmo when the circuit is open and the positive electrode potential Ppc and the negative electrode potential Pmc when the circuit is closed and a charge current is fed therein. As is shown in FIG. 5, the lithium-ion secondary battery is charged first by the CC charge and the positive electrode potential Ppo rises whereas the negative electrode Pmo drops with an increase of the SOC. In this instance, a voltage drop caused by the internal resistance of the battery occurs due to the charge current flowing into the lithium-ion secondary battery. Hence, the positive electrode potential Ppc and the negative electrode potential Pmc, which are the actual electrode potentials during the charge, become higher than the positive electrode potential Ppo and lower than the negative electrode potential Pmo, respectively.

When the negative electrode potential Pmc has dropped to 0 V because of the CC charge, a potential difference between the positive electrode potential Ppc and the negative electrode potential Pmc, that is, the terminal voltage across the lithium-ion secondary battery, is found to be a reference voltage Ve, for example, 4.2 V. In the case of a unit cell, the end voltage Vf at which the CC charge is ended is set to the reference voltage Ve. In the case of a set battery formed by connecting a plurality of cells in series, it is set to a value found by multiplying the reference voltage Ve by the cell number of the lithium-ion secondary batteries in series.

When the terminal voltage across the lithium-ion secondary battery has reached the end voltage Vf, that is, when the terminal voltage across each cell has reached the reference voltage Ve and the negative potential Pmc has dropped to substantially 0 V, the charger switches the CC charge to the CV charge.

Incidentally, a lithium-ion secondary battery has a characteristic that the battery characteristic, such as the cycle life, deteriorates when a charge current is large because the charge efficiency, which is a ratio of a current contributing to a charge reaction with respect to the charge current, decreases due to the internal resistance of the battery and the battery temperature rises as Joule heat generated by a charge current that does not contribute to the charge reaction consequently increases. In the charge reaction of the lithium-ion secondary battery, lithium in lithium cobalt oxide in the positive electrode turns into lithium ions that migrate between layers of negative electrode carbon. Hence, the lithium-ion secondary battery has a characteristic that the battery characteristic readily deteriorates also when the terminal voltage across the cell nears to the reference voltage Ve (for example, 4.2 V) because it becomes difficult for lithium ions to enter between layers of the negative electrode carbon and the charge efficiency deteriorates significantly, which increases Joule heat generated by a charge current that does not contribute to the charge reaction.

Under these circumstances, deterioration of the battery characteristic caused by the CC charge is conventionally suppressed by setting the reference current value Ie, which is a current at which the battery characteristic does not deteriorate substantially when the terminal voltage across the cell is the reference voltage Ve, to a charge current value I2 of the CC charge.

Meanwhile, the reference current value Ie tends to decrease recently as the capacity of the lithium-ion secondary battery increases. Accordingly, when the reference current value Ie is used as the charge current value I2 of the CC charge, there arises an inconvenience that a charge time is extended because of the synergistic effect of an increase of the capacity and a decrease of the charge current. To overcome this inconvenience, as is shown in FIG. 4, the charge current value I2 is increased to exceed the reference current value Ie to a maximum extent within a range to have a cycle life required for the lithium-ion secondary battery to meet market needs, so that the charge time is shortened while allowing the cycle life to become shorter to some degree.

However, there are market needs to shorten the charge time on one hand, there are market needs to prolong the cycle life on the other hand. It is therefore unfavorable to shorten the cycle life in order to shorten the charge time as described above. In addition, when the charge current value I2 of the CC charge is increased to a current value exceeding the reference current value Ie, the battery is charged in a overvoltage state where the charge voltage exceeds the end voltage Vf during a delay time until the CC charge is switched to the CV charge since it is detected that the terminal voltage Vt across the lithium-ion secondary battery has reached the end voltage Vf. When such a charge and discharge cycle is repeated, there is an inconvenience that deterioration of the battery characteristic caused by an overvoltage is accumulated and increased.

Patent Document 1: JP-A-6-78471

DISCLOSURE OF THE INVENTION

An object of the invention is to provide a charging system, a charger, and a battery pack capable of reducing deterioration of the battery characteristic while shortening the charge time of a nonaqueous electrolyte secondary battery.

A charging system according to an aspect of the invention includes: a nonaqueous electrolyte secondary battery; a charge current feed portion that feeds a charge current to the nonaqueous electrolyte secondary battery; a voltage detection portion that detects a terminal voltage across the nonaqueous electrolyte secondary battery; a first charge control portion that performs initial current set processing by which the charge current feed portion is controlled to feed, as a feed amount of the charge current by the charge current feed portion, the charge current at a first current value exceeding a reference current value preset as a current value of the charge current at which the charge current is flown without causing substantially any deterioration in the nonaqueous electrolyte secondary battery while negative electrode potential of the nonaqueous electrolyte secondary battery is substantially 0 V; and a second charge control portion that causes, after the initial current set processing is performed by the first charge control portion, the feed amount of the charge current by the charge current feed portion to change so that the current value decreases as the terminal voltage detected by the voltage detection portion increases until the terminal voltage detected by the voltage detection portion reaches an end voltage, which is the terminal voltage across the nonaqueous electrolyte secondary battery when the negative electrode potential of the nonaqueous electrolyte secondary battery is substantially 0 V.

A charger according to another aspect of the invention includes: a connection terminal that is connected to a nonaqueous electrolyte secondary battery; a charge current feed portion that feeds a charge current for charging the nonaqueous electrolyte secondary battery to the connection terminal; a voltage detection portion that detects a terminal voltage across the nonaqueous electrolyte secondary battery connected to the connection terminal; a first charge control portion that performs initial current set processing by which the charge current feed portion is controlled to feed, as a feed amount of the charge current by the charge current feed portion, the charge current at a first current value exceeding a reference current value preset as a current value of the charge current at which the charge current is flown without causing deterioration in the nonaqueous electrolyte secondary battery while negative electrode potential of the nonaqueous electrolyte secondary battery is substantially 0 V; and a second charge control portion that causes, after the initial current set processing is performed by the first charge control portion, the feed amount of the charge current by the charge current feed portion to change so that the current value decreases as the terminal voltage detected by the voltage detection portion increases until the terminal voltage detected by the voltage detection portion reaches an end voltage, which is the terminal voltage across the nonaqueous electrolyte secondary battery when the negative electrode potential of the nonaqueous electrolyte secondary battery is substantially 0 V.

A battery pack according to still another aspect of the invention is a battery pack connected to a charger that outputs a charge current for charging a nonaqueous electrolyte secondary battery according to a request from an outside and including: a nonaqueous electrolyte secondary battery; a voltage detection portion that detects a terminal voltage across the nonaqueous electrolyte secondary battery; a first charge control portion that performs initial current set processing by which a command is issued to the charger to set a feed amount of the charge current to a first current value exceeding a reference current value preset as a current value of the charge current at which the charge current is flown without causing deterioration in the nonaqueous electrolyte secondary battery while negative electrode potential of the nonaqueous electrolyte secondary battery is substantially 0 V; and a second charge control portion that calculates, after the initial current set processing is performed by the first charge control portion, the feed amount of the charge current so that the current value decreases as the terminal voltage detected by the voltage detection portion increases until the terminal voltage detected by the voltage detection portion reaches an end voltage, which is the terminal voltage across the nonaqueous electrolyte secondary battery when the negative electrode potential of the nonaqueous electrolyte secondary battery is substantially 0 V, and makes a notification and/or a request about the calculated feed amount to the charger.

According to the charging system, the charger, and the battery pack configured as above, a feed amount of the charge current to the nonaqueous electrolyte secondary battery by the charge current feed portion is set by the first charge control portion to the first current value exceeding the reference current value preset as a current value of the charge current at which the charge current is flown without causing substantially any deterioration in the nonaqueous electrolyte secondary battery while negative electrode potential of the nonaqueous electrolyte secondary battery is substantially 0 V. The charge current is changed so that the current value decreases as the terminal voltage detected by the voltage detection portion increases by the second charge control portion until the terminal voltage detected by the voltage detection portion reaches the end voltage, which is the terminal voltage across the nonaqueous electrolyte secondary battery when the negative electrode potential of the nonaqueous electrolyte secondary battery is substantially 0 V.

In this case, charge is performed at the first current value exceeding the reference current value in the initial stage where the nonaqueous electrolyte secondary battery is charged as it is fed with the charge current and the terminal voltage keeps increasing, that is, when the battery characteristic is hardly deteriorated due to an increase of the charge current. It thus becomes possible to shorten the charge time of the nonaqueous electrolyte secondary battery. In addition, the charge current of the nonaqueous electrolyte secondary battery decreases as the terminal voltage detected by the voltage detection portion increases until the terminal voltage of the nonaqueous electrolyte secondary battery detected by the voltage detection portion has increased to reach the end voltage. The charge current when the terminal voltage of the secondary electrolyte secondary battery has reached the end voltage is therefore consequently reduced, which makes it possible to reduce deterioration of the battery characteristic.

BEST MODE FOR CARRYING OUT THE INVENTION

Figure 1:
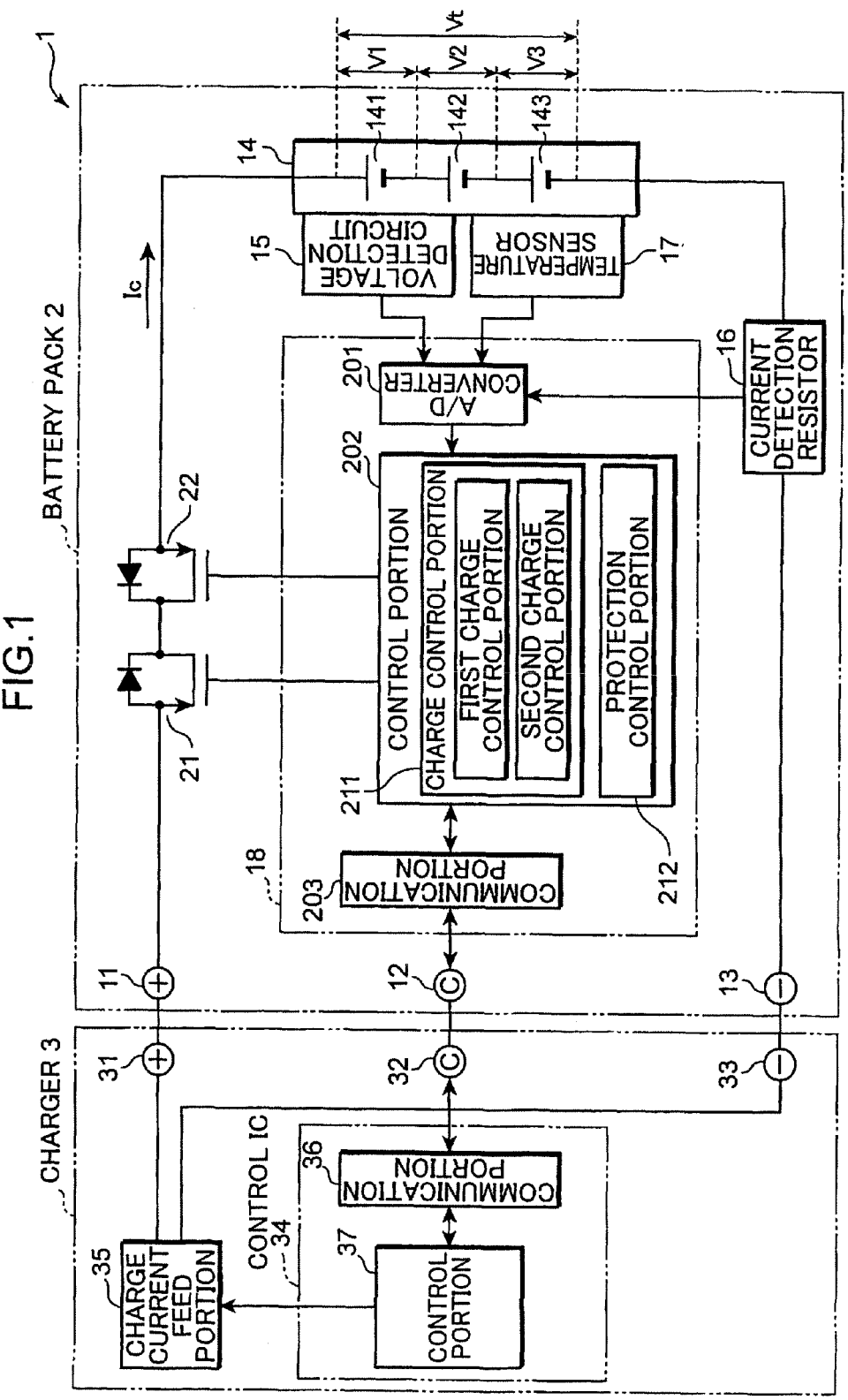
FIG. 1 is a block diagram showing an example of the configuration of a charging system formed of a charger and a battery pack according to one embodiment of the invention.

Hereinafter, one embodiment of the invention will be described with reference to the drawings. Components labeled with the same reference numerals denote the same components and descriptions thereof are omitted. FIG. 1 is a block diagram showing an example of the configuration of a charging system 1 formed of a charger 3 and a battery pack 2 according to one embodiment of the invention. The charging system 1 is formed by providing the battery pack 2 with the charger 3 that charges the battery pack 2. However, an electronic equipment system may be formed by further including an unillustrated load device to which electricity is fed from the battery pack 2. In this case, in contrast to the configuration of FIG. 1 where the battery pack 2 is charged by the charger 3, the battery pack 2 may be attached to the load device so that it is charged via the load device.

The battery pack 2 includes connection terminals 11, 12, and 13, a set battery 14 (nonaqueous electrolyte secondary batteries), a voltage detection circuit 15 (voltage detection portion), a current detection resistor 16, a temperature sensor 17, a control IC 18, and FETs 21 and 22. The control IC 18 includes an A/D (Analog-to-Digital) converter 201, a control portion 202, and a communication portion 203.

The charger 3 includes connection terminals 31, 32, and 33, a control IC 34, and a charge current feed portion 35. It should be appreciated, however, that the invention is not limited to a case where the control portion 202 is provided to the battery pack 2, and the control portion 202 may be provided to the charger 3. Alternatively, the control portion 202 may be allocated to both the battery pack 2 and the charger 3.

The battery pack 2 and the charger 3 are connected to each other with the connection terminals 11 and 31 on the DC (Direct Current) high side for electric feeding, the connection terminals 12 and 32 for a communication signal, and the connection terminals 13 and 33 for electric feeding and a communication signal. In a case where the load device is provided, similar terminals are provided to the battery pack 2 and the load device.

The charging system 1 is not necessarily formed in such a manner that the battery pack 2 and the charger 3 can be separated from each other and the charging system 1 as a whole may be formed as a single battery circuit. In this case, the connection terminals 11 and 31 and the connection terminals 13 and 33 can be members that merely connect a current path for charging and discharging the set battery 14 to the charge current feed portion 35, and for example, they may be connectors or wiring patterns, such as lands and pads.

In the battery pack 2, the connection terminal 11 is connected to the positive electrode of the set battery 14 via the discharge FET 21 and the charge FET 22. As the FETs 21 and 22, p-channel FETs are available. The FETs 21 and 22 are connected so that the parasitic diodes are in the opposite directions. The connection terminal 13 is connected to the negative electrode of the set battery 14 via the current detection resistor 16. The current path is formed from the connection terminal 11 to the connection terminal 13 via the FETs 21 and 22, the set battery 14, and the current detection resistor.

The current detection resistor 16 converts a charge current and a discharge current of the set battery 14 to a voltage value. The set battery 14 is a set battery formed by connecting more than one, for example, three secondary batteries 141, 142, and 143 in series. The secondary batteries 141, 142, and 143 are nonaqueous electrolyte secondary batteries, for example, lithium-ion secondary batteries.

The temperature sensor 17 is a temperature sensor that detects temperatures of the secondary batteries 141, 142, and 143. The temperatures of the secondary batteries 141, 142, and 143 are detected by the temperature sensor 17 and then inputted into the A/D converter 201 in the control IC 18. Also, a terminal voltage Vt across the set battery 14 and terminal voltages V1, V2, and V3 across the secondary batteries 141, 142, and 143, respectively, are read by the voltage detection circuit 15 and inputted into the A/D converter 201 in the control IC 18. Further, the current value of a charge current Ic detected by the current detection resistor 16 is also inputted into the A/D converter 201 in the control IC 18. The A/D converter 201 converts the respective values inputted therein to digital values, which are outputted to the control portion 202.

The control portion 202 includes a CPU (Central Processing Unit) that performs, for example, predetermined arithmetic processing, a ROM (Read Only Memory) in which a predetermined control program is pre-stored, a RAM (Random Access Memory) in which data is stored temporarily, and peripheral circuits. The control portion 202 functions as a charge control portion 211 (first and second charge control portions) and a protection control portion 212 by running the control program pre-stored in the ROM.

The charge control portion 211 computes a voltage value and a current value of a charge current requested to be outputted from the charger 3 in response to the respective values inputted therein from the A/D converter 201 and transmits the computation result to the charger 3 from the communication portion 203 via the connection terminals 12 and 32.

To be more concrete, the charge control portion 211 performs the so-called CCCV charge, for example, by performing the CC charge by feeding a predetermined charge current Ic from the charger 3 and, when the terminal voltage Vt across the set battery 14 has reached the preset constant end voltage Vf, switching the CC charge to the CV charge to charge the set battery 14 by applying the end voltage Vf. It should be appreciated that the charge method of the charge control portion 211 is not limited to the CCCV charge and various charge methods are available. For example, a method of performing pulse charge to feed a pulse-wise charge current after the CC charge and a method of performing trickle charge to perform charge using a minute current after the CC charge are available. Alternatively, it may be configured in such a manner that the set battery 14 is charged while a load current is fed to an unillustrated load circuit.

Over the period while the CC charge is performed, the charge control portion 211 first performs initial current set processing to increase a feed amount of the charge current Ic by the charge current feed portion 35 to a current value I1 (first current value) exceeding the preset reference current value Ie and thence the current reduction processing to change the charge current so that the current value decreases as the terminal voltage Vt detected by the voltage detection circuit 15 increases until the terminal voltage across the set battery 14 detected by the voltage detection circuit 15 reaches the end voltage Vf.

The reference current value Ie is a current value of the charge current at which the charge current can be flown without causing substantially any deterioration in the secondary batteries 141, 142, and 143, that is, by hardly giving influences of deterioration in practical use, while the negative electrode potentials of the secondary batteries 141, 142, and 143 is substantially 0 V. The reference current value Ie can be found, for example, empirically, and a concrete value of the reference current value Ie is preferably in a range of 0.7 It to 1.01 It (It=capacity (Ah)/1 (h)).

A potential difference between the positive electrode potential Ppc and the negative potential Pmc when the negative electrode potential Pmc of each of the secondary batteries 141, 142, and 143 is substantially 0 V, that is, the terminal voltages V1, V2, and V3 across the secondary batteries 141, 142, and 143, respectively, are set as the reference voltage Ve (about 4.2 V). Also, a value found, for example, by multiplying the reference voltage Ve by 3, which is the cell number of the secondary batteries 141, 142, and 143 in series, is set to the end voltage Vf.

The phrase, "the negative electrode potential is substantially 0 V", means that a range of variance caused by the environmental conditions, such as the temperatures of the secondary batteries 141, 142, and 143, a characteristic variance due to fabrication reasons, and a measurement error, includes 0 V, and it specifies, for example, that the negative electrode potential falls within a range of 0 V±0.1 V.

The protection control portion 212 detects an abnormality on the outside the battery pack 2, such as a short circuit between the connection terminals 11 and 13 and an abnormal current from the charger 3, and an abnormal temperature rise of the set battery 14 on the basis of the respective values inputted therein from the A/C converter 201. To be more concrete, for example, when the current value detected by the current detection resistor 16 exceeds a preset abnormal current determination threshold value, it determines the occurrence of an abnormality caused by a short circuit between the connection terminals 11 and 13 or an abnormal current from the charger 3. Also, for example, when the temperatures of the secondary batteries 141, 142, and 143 detected by the temperature sensor 17 exceed a preset abnormal temperature determination threshold value, it determines the occurrence of an abnormality in the set battery 14. Upon detection of such an abnormality, the protection control portion 212 turns OFF the FETs 12 and 13 to perform a protection operation to safeguard the set battery 14 from an abnormality, such as an overcurrent and overheating.

The charger 3 receives a request from the charge control portion 211 at the communication portion 36 serving as communication means in the control IC 34. Then, the control portion 37 serving as charge control means controls the charge current feed portion 35 (charge portion) serving as charge current feeding means to feed a charge current at a voltage value, a current value, and a pulse width according to the request. The charge current feed portion 35 is formed of an AC-to-DC converter or a DC-to-DC converter. The charge current feed portion 35 then converts the input voltage fed from the outside to the voltage value, the current value, and the pulse width specified by the control portion 37 and feeds the conversion result to the battery pack 2 via the connection terminals 31 and 11 and the connection terminals 33 and 13.

The battery pack 2 and the charger 3 are, for example, in accordance with the Smart Battery System standardized by the SBS-IF (Smart Battery System Implementers Forum), which is an association that coordinates the standardization of batteries. The charge control portion 211 is capable of issuing a request command requesting a charge current to the charger 3 by setting a request value of the charge current, for example, at the address of the Smart Battery Data, 0x14 [hex].

It should be noted that the charger 3 may be provided with the charge control portion 211 instead of the control portion 37, so that an operation of the charge current feed portion 35 is controlled by a request from the charge control portion 211 while the communication portion 203 may transmit the terminal voltage Vt and the charge current Ic obtained by the A/D converter 201 to the charge control portion 211 provided to the charger 3 via the communication portion 36. In this case, the communication portion 36 corresponds to an example of the voltage detection portion.

It should be appreciated that the charger 3 is not limited to a type that charges the battery pack 2. It may include the charge control portion 211, the voltage detection circuit 15, the current detection resistor 16, and so forth, so that it charges the set battery 14 connected directly to the connection terminals 31 and 33.

Figure 2:
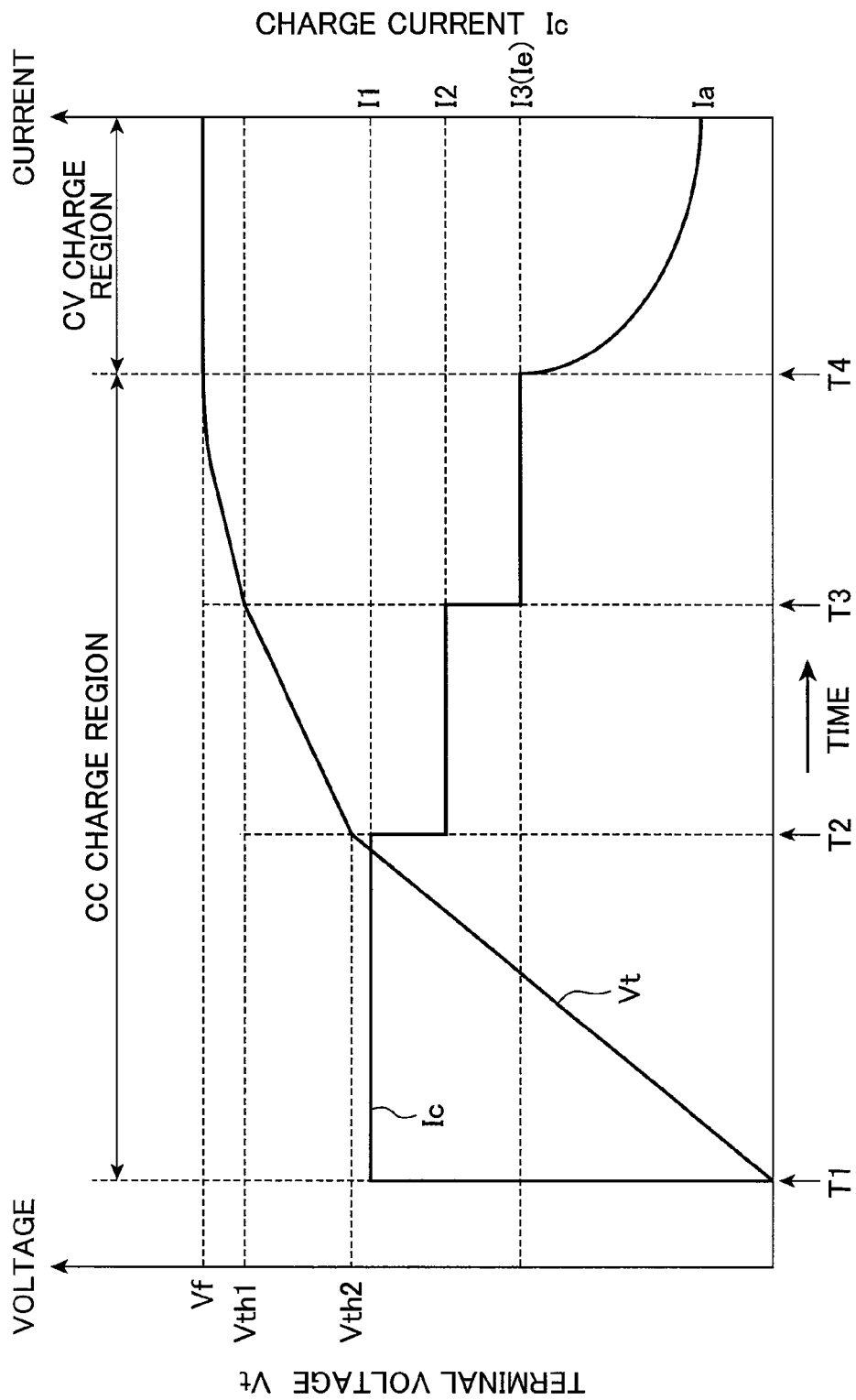
FIG. 2 is a view used to describe an example of operations of the charging system shown in FIG. 1.
Figure 3:
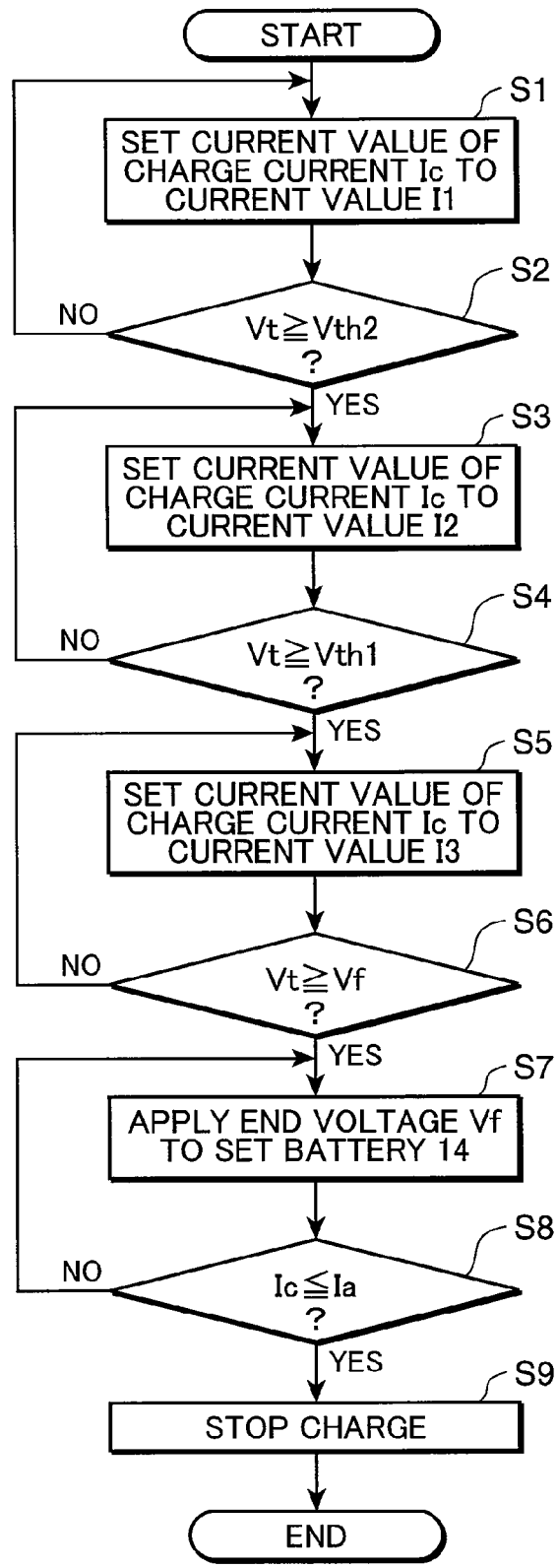
FIG. 3 is a flowchart showing an example of the operations of the charging system shown in FIG. 1.

Operations of the charging system 1 configured as above will now be described. FIG. 2 is a view used to describe an example of the operations of the charging system 1. FIG. 3 is a flowchart showing an example of the operations of the charging system 1. Firstly, the initial current set processing is performed by the charge control portion 211, by which a request command requesting the charge current Ic at the current value I1 exceeding the reference current value Ie is transmitted to the control portion 37 via the communication portion 203 and the communication portion 36. Then, an output current of the charge current feed portion 35 is set to the current value I1 by the control portion 37 and the CC charge is started (Step S1). Accordingly, the charge current Ic outputted from the charge current feed portion 35 increases to the current value I1 (timing T1).

Here, given C as the nominal capacity of the set battery 14, then, for example, a current value of 0.8 C is set to the current value I1. For example, let the nominal capacity C of the set battery 14 be 2400 mAh, then, we obtain I1=0.8 C=1920 mA. As the set battery 14 is charged with the charge current Ic at the current value I1, the terminal voltage Vt increases gradually.

Subsequently, the terminal voltage Vt detected by the voltage detection circuit 15 and a preset threshold value voltage Vth2 (second threshold value voltage) are compared by the charge control portion 211 (Step S2). When the terminal voltage Vt has reached the threshold value voltage Vth2 (YES in Step S2), a request command to reduce the charge current Ic from the current value I1 to a current value I2 is transmitted to the control portion 37 by the charge control portion 211. Accordingly, the current reduction processing is performed by the control portion 37 by setting an output current of the charge current feed portion 35 to the current value I2 (Step S3). The charge current Ic outputted from the charge current feed portion 35 is thus reduced to the current value I2 (timing T2).

A voltage at or below 4.10 V, for example, a voltage of about 4.10 V is preferably used as the threshold value voltage Vth2. In addition, a current value, for example, of 0.7 It is set as the current value I2. For example, let the nominal capacity C of the set battery 14 be 2400 mAh, then we obtain I2=0.7 C=1680 mA.

Subsequently, the terminal voltage Vt detected by the voltage detection circuit 15 and a preset threshold value voltage Vth1 (first threshold value voltage) are compared by the charge control portion 211 (Step S4), and when the terminal voltage Vt has reached the threshold value voltage Vth1 (YES in Step S4), a request command to reduce the charge current Ic from the current value I2 to a current value I3 is transmitted to the control portion 37 by the charge control portion 211. Accordingly, the current reduction processing is performed by the control portion 37 by setting the output current of the charge current feed portion 35 to the current value I3 (Step S5). The charge current Ic outputted from the charge current feed portion 35 is thus reduced to the current value I3 (Timing T3).

A voltage exceeding the threshold value voltage Vth2 and falling short of the end voltage Vf, for example, a voltage of about 4.15 V is suitably used as the threshold value voltage Vth1. Also, the current value I3 is set to a current value at or below the reference current value Ie that has been found empirically, for example, the reference current value Ie. Although the reference current value Ie differs from cell to cell and there is a tendency that the reference current value Ie becomes smaller as the capacity of the cell increases, it is a current value, for example, of about 0.5 It. For instance, let the nominal capacity C of the set battery 14 be 2400 mAh, then we obtain I3=Ie=0.5 C=1200 mA.

Subsequently, the terminal voltage Vt detected by the voltage detection circuit 15 and the preset end voltage Vf are compared by the charge control portion 211 (Step S6), and when the terminal voltage Vt has reached the end voltage Vf (YES in Step S6), the CC charge is switched to the CV charge by the charge control portion 211. A request command requesting to output the end voltage Vf is then transmitted to the control portion 37 by the charge control portion 211. The output voltage of the charge current feed portion 35 is thus set to the end voltage Vf by the control portion 37 (Step S7). Accordingly, the end voltage Vf is applied between the connection terminals 31 and 33 by the charge current feed portion 35. The end voltage Vf is thus applied across the set battery 14 via the connection terminals 11 and 13 and the CV charge is started (timing T4).

While the CV charge is performed, the charge current Ic fed from the charge current feed portion 35 is kept reduced so that the terminal voltage Vt detected by the voltage detection circuit 15 is maintained at the end voltage Vf according to the command from the charge control portion 211. Then, the charge current Ic detected by the current detection resistor 16 and a preset current value Ia are compared by the charge control portion 211 (Step S8), and when the charge current Ic has been reduced to or below the current value Ia (YES in Step S8), full charge is determined and the feeding of the charge current is stopped (Step S9).

As has been described, owing to the processing in Steps S1 and S2, the terminal voltage Vt across the set battery 14 is too low to reach the threshold value voltage Vth2, which gives rise to a large difference between the terminal voltages V1, V2, and V3 of the secondary batteries 141, 142, and 143, respectively, and the reference voltage Ve (for example, 4.2 V). Accordingly, when the battery characteristic is hardly deteriorated by an increase of the charge current, by performing the initial current set processing (timings T1 to T2) to increase the charge current Ic to the current value I1 exceeding the reference current value Ie, the charge time can be readily shortened by increasing the charge current Ic while reducing deterioration of the battery characteristic.

Figure 4:
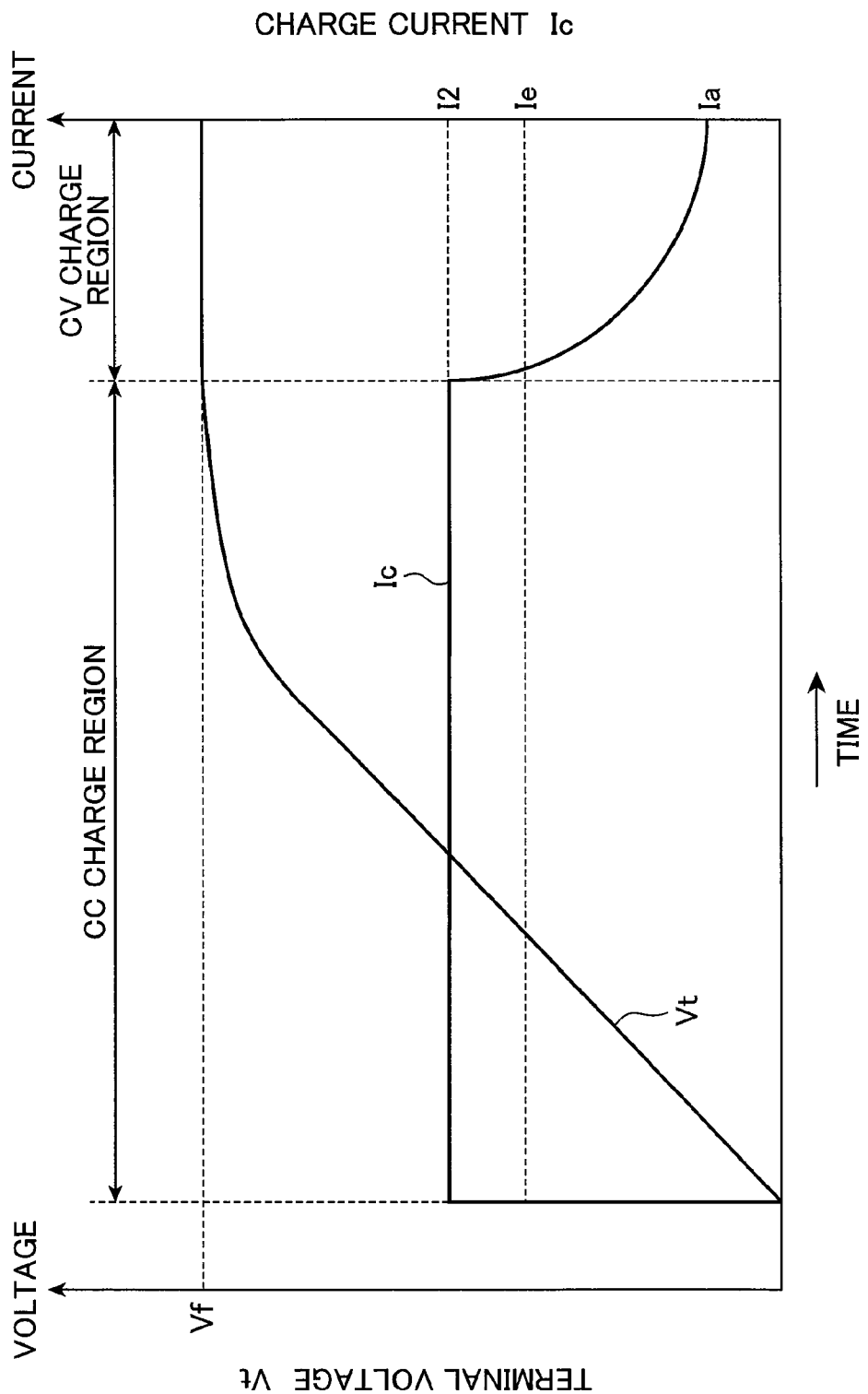
FIG. 4 is a view used to describe a charge operation of a secondary battery by the CCCV (Constant Current Constant Voltage) charge according to the background art.
Figure 5:
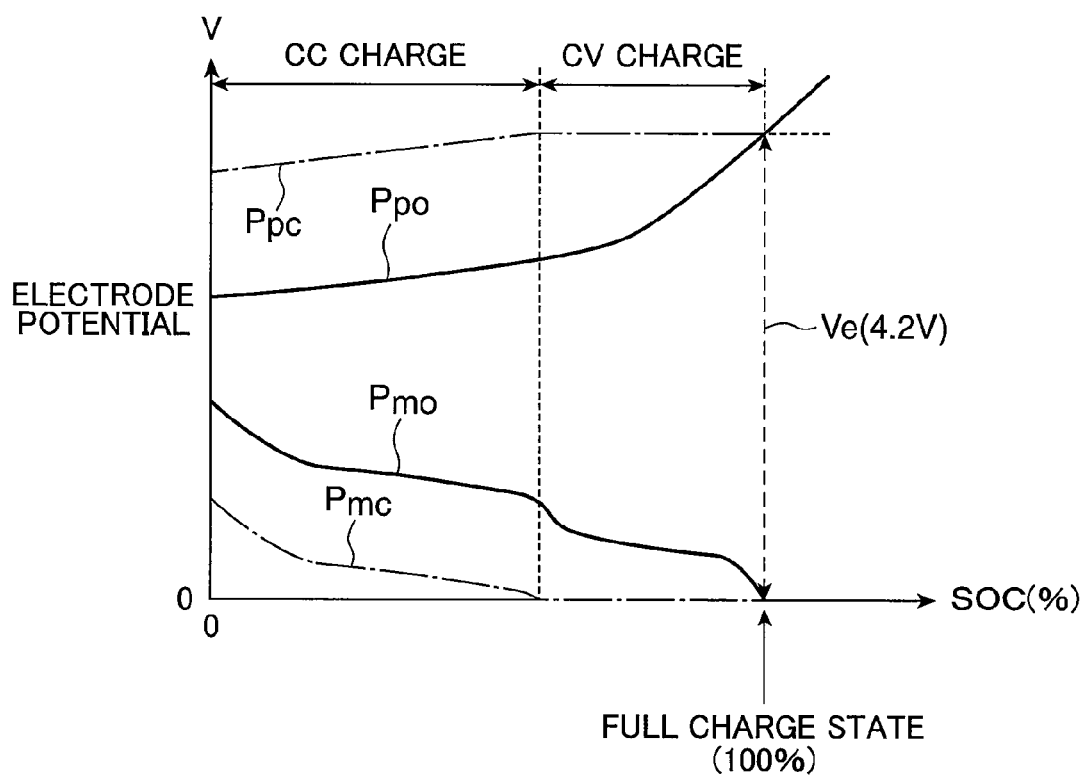
FIG. 5 is a view showing a case where a lithium-ion secondary battery is charged to describe a relation of the SOC, the positive electrode potential Ppo and the negative electrode potential Pmo when the circuit is open and the positive electrode potential Ppc and the negative electrode potential Pmc when the circuit is closed and a charge current is fed therein.

In this case, in comparison with a case as in the background art shown in FIG. 4 where the current value I2 exceeding the reference current value Ie is maintained until the CC charge ends, that is, until the terminal voltages V1, V2, and V3 across the secondary batteries 141, 142, and 143, respectively, reach the reference voltage Ve to the extent that the battery characteristic is readily deteriorated by an increase of the charge current, it becomes easier to shorten the charge time while reducing deterioration of the battery characteristic by setting a current value further larger than the current value I2 as the current value I1.

Also, owing to the processing in Steps S3 and S4, it is thought that the battery characteristic is more readily deteriorated than in the timings T1 to T2 in an intermediate region (timings T2 to T3) where the terminal voltage Vt across the set battery 14 rises by the CC charge and reaches the threshold value voltage Vth2 but still falls short of the threshold value voltage Vth1, which gives rise to certain or more differences between the terminal voltages V1, V2, and V3 of the secondary batteries 141, 142, and 143, respectively and the reference voltage Ve. Hence, by reducing the charge current Ic below the current value I1 and by setting it to the current value I2 exceeding the reference current value Ie, the charge time can be readily shortened by increasing the charge current Ic while reducing deterioration of the battery characteristic. The current value I2 in this case can be set, for example, to a current value almost as large as the current value I2 in the background art shown in FIG. 4.

Owing to the processing in Steps S5 and S6, when differences between the terminal voltages V1, V2, and V3 across the secondary batteries 141, 142, and 143, respectively, and the reference current value Ve become so small as the terminal voltage Vt across the set battery 14 has risen to reach the threshold value voltage Vth1 by the CC charge, the charge current Ic is reduced to the reference current value Ie at which the battery characteristic, such as the cycle life, are not substantially deteriorated even when the terminal voltages V1, V2, and V3 reach the reference voltage Ve. It thus becomes possible to reduce deterioration of the battery characteristic. In addition, because the charge current Ic is reduced to the reference current value Ie before the terminal voltage Vt across the set battery 14 reaches the end voltage Vf, it is possible to reduce the possibility of an inconvenience that the battery is charged in an overvoltage state where the charge voltage exceeds the end voltage Vf and the battery characteristic is deteriorated by an overvoltage in a delay time until the CC charge is switched to the CV charge since it is detected that the terminal voltage Vt has reached the end voltage Vf as in the background art.

The above has described, as the current reduction processing, a case where the threshold value voltage Vth2 and the threshold value voltage Vth1 are provided, so that the charge current Ic is reduced from the current value I1 to the current value I2 and from the current value I2 to the current value I3 in two steps. However, it may be configured in such a manner that, for example, the threshold value voltage Vth2 is omitted, so that the charge current Ic is reduced from the current value I1 to the current value I3 only once.

Alternatively, in the current reduction processing, more than one threshold value voltage may be provided between the threshold value voltage Vth2 and the end voltage Vf, so that the charge current Ic is reduced smoothly by reducing the current charge Ic each time the terminal voltage Vt reaches the respective threshold value voltages.

Further, it is not essentially necessary to provide a period over which the charge current Ic is maintained at the constant current value in the CC charge region. It may be configured in such a manner that the charge current Ic is increased by the initial current set processing first and thence it is reduced toward a current value at or below the reference current value Ie smoothly or step by step.

A charging system according to an aspect of the invention includes: a nonaqueous electrolyte secondary battery; a charge current feed portion that feeds a charge current to the nonaqueous electrolyte secondary battery; a voltage detection portion that detects a terminal voltage across the nonaqueous electrolyte secondary battery; a first charge control portion that performs initial current set processing by which the charge current feed portion is controlled to feed, as a feed amount of the charge current by the charge current feed portion, the charge current at a first current value exceeding a reference current value preset as a current value of the charge current at which the charge current is flown without causing substantially any deterioration in the nonaqueous electrolyte secondary battery while negative electrode potential of the nonaqueous electrolyte secondary battery is substantially 0 V; and a second charge control portion that causes, after the initial current set processing is performed by the first charge control portion, the feed amount of the charge current by the charge current feed portion to change so that the current value decreases as the terminal voltage detected by the voltage detection portion increases until the terminal voltage detected by the voltage detection portion reaches an end voltage, which is the terminal voltage across the nonaqueous electrolyte secondary battery when the negative electrode potential of the nonaqueous electrolyte secondary battery is substantially 0 V.

According to this configuration, a feed amount of the charge current to the nonaqueous electrolyte secondary battery by the charge current feed portion is set by the first charge control portion to the first current value exceeding the reference current value preset as a current value of the charge current at which the charge current is flown without causing substantially any deterioration in the nonaqueous electrolyte secondary battery while negative electrode potential of the nonaqueous electrolyte secondary battery is substantially 0 V. The charge current is changed so that the current value keeps decreasing with an increase of the terminal voltage detected by the voltage detection portion by the second charge control portion until the terminal voltage detected by the voltage detection portion reaches the end voltage, which is the terminal voltage across the nonaqueous electrolyte secondary battery when the negative electrode potential of the nonaqueous electrolyte secondary battery is substantially 0 V.

In this case, charge is performed at the first current value exceeding the reference current value in the initial stage where the nonaqueous electrolyte secondary battery is charged as it is fed with the charge current and the terminal voltage keeps increasing, that is, when the battery characteristic is hardly deteriorated due to an increase of the charge current. It thus becomes possible to shorten the charge time of the nonaqueous electrolyte secondary battery. In addition, the charge current of the nonaqueous electrolyte secondary battery keeps decreasing with an increase of the terminal voltage until the terminal voltage across the nonaqueous electrolyte secondary battery detected by the voltage detection portion has increased to reach the end voltage. The charge current when the terminal voltage across the secondary electrolyte secondary battery has reached the end voltage is therefore consequently reduced, which makes it possible to reduce deterioration of the battery characteristic.

Also, it is preferable that the second charge control portion maintains the feed amount of the charge current by the charge current feed portion at the reference current value after the feed amount of the charge current is reduced to the reference current value until the terminal voltage detected by the voltage detection portion reaches the end voltage.

According to this configuration, after the feed amount of the charge current by the charge current feed portion is reduced to the reference current value, the feed amount of the charge current is maintained at the reference current value by the second charge control portion until the terminal voltage detected by the voltage detection portion reaches the end voltage. In this case, once the charge current has been reduced to the current value at and above which the charge current can be flown without substantially deteriorating the nonaqueous electrolyte secondary battery while the negative electrode potential of the nonaqueous electrolyte secondary battery is substantially 0 V, the charge current will not be reduced any further, and the charge is continued until the terminal voltage of the nonaqueous electrolyte secondary battery reaches the end voltage. It thus becomes possible to reduce deterioration of the battery characteristic while reducing the possibility that the charge time is extended by exceedingly reducing the charge current.

Also, it is preferable that the second charge control portion sets the feed amount of the charge current by the charge current feed portion to the reference current value in a case where the terminal voltage detected by the voltage detection portion has become as high as or higher than a first threshold value voltage preset to a value falling short of the end voltage.

According to this configuration, the charge current of the nonaqueous electrolyte secondary battery is set to the reference voltage value by the second charge control portion in a case where the terminal voltage across the nonaqueous electrolyte secondary battery has increased to become as high as or higher than the first threshold value voltage preset to a value falling short of the end voltage while the charge current is fed by the charge current feed portion. It thus becomes possible to reduce the possibility that the charge current flowing when the terminal voltage across the nonaqueous electrolyte secondary battery has reached the end voltage exceeds the reference current value and thereby deteriorates the nonaqueous electrolyte secondary battery.

Also, it is preferable that the second charge control portion further sets, in a case where the terminal voltage detected by the voltage detection portion becomes a voltage as high as or higher than a second threshold value voltage preset to a value falling short of the first threshold value voltage and less than the first threshold value voltage, the feed amount of the charge current by the charge current feed portion to a second current value preset to a value falling short of the first current value and exceeding the reference current value.

According to this configuration, in a case where the terminal voltage across the nonaqueous electrolyte secondary battery has increased to become a voltage as high as or higher than the second threshold value voltage preset to a value falling short of the first threshold value voltage and less than the first threshold value voltage while the charge current is fed by the charge current feed portion, a feed amount of the charge current of the nonaqueous electrolyte secondary battery is set to a value falling short of the first current value and exceeding the reference current value by the second charge control portion. In an intermediate region where the nonaqueous electrolyte secondary battery has been charged and the terminal voltage becomes a voltage as high as or higher than the second threshold value voltage and less than the first threshold value voltage, it is thought that the battery characteristic is more readily deteriorated than at the beginning of the charge. Hence, the charge time can be readily shortened by increasing the charge current while reducing deterioration of the battery characteristic by reducing the charge current to a current value below the first current value and exceeding the reference current value.

Also, it is preferable that the second charge current control portion further starts, when the terminal voltage detected by the voltage detection portion has reached the end voltage, constant voltage charge by which the feed amount of the charge current by the charge current feed portion is kept reduced so that the terminal voltage detected by the voltage detection portion maintains the end voltage.

According to this configuration, the constant voltage charge is started when the nonaqueous electrolyte secondary battery is charged with the charge current fed to the nonaqueous electrolyte secondary battery by the charge current feed portion and the terminal voltage has risen to the extent that the terminal voltage across the nonaqueous electrolyte secondary battery detected by the voltage detection portion has reached the end voltage, so that the terminal voltage across the nonaqueous electrolyte secondary battery is maintained at the end voltage. Hence, the charge current is kept reduced as the charge proceeds while the possibility that the battery characteristic is deteriorated by an overvoltage is reduced. Hence, Joule heat generated by the charge current is consequently reduced, which can in turn reduce the possibility that the battery characteristic is deteriorated.

A charger according to another aspect of the invention includes: a connection terminal that is connected to a nonaqueous electrolyte secondary battery; a charge current feed portion that feeds a charge current for charging the nonaqueous electrolyte secondary battery to the connection terminal; a voltage detection portion that detects a terminal voltage across the nonaqueous electrolyte secondary battery connected to the connection terminal; a first charge control portion that performs initial current set processing by which the charge current feed portion is controlled to feed, as a feed amount of the charge current by the charge current feed portion, the charge current at a first current value exceeding a reference current value preset as a current value of the charge current at which the charge current is flown without causing deterioration in the nonaqueous electrolyte secondary battery while negative electrode potential of the nonaqueous electrolyte secondary battery is substantially 0 V; and a second charge control portion that causes, after the initial current set processing is performed by the first charge control portion, the feed amount of the charge current by the charge current feed portion to change so that the current value decreases as the terminal voltage detected by the voltage detection portion increases until the terminal voltage detected by the voltage detection portion reaches an end voltage, which is the terminal voltage across the nonaqueous electrolyte secondary battery when the negative electrode potential of the nonaqueous electrolyte secondary battery is substantially 0 V.

According to this configuration, in a case where a nonaqueous electrolyte secondary battery is charged by connecting it to the connection terminal of the charger according to one aspect of the invention, it becomes possible to reduce deterioration of the battery characteristic while shortening the charge time of the nonaqueous electrolyte secondary battery.

A battery pack according to still another aspect of the invention is a battery pack connected to a charger that outputs a charge current for charging a nonaqueous electrolyte secondary battery according to a request from an outside and including: a nonaqueous electrolyte secondary battery; a voltage detection portion that detects a terminal voltage across the nonaqueous electrolyte secondary battery; a first charge control portion that performs initial current set processing by which a command is issued to the charger to set a feed amount of the charge current to a first current value exceeding a reference current value preset as a current value of the charge current at which the charge current is flown without causing deterioration in the nonaqueous electrolyte secondary battery while negative electrode potential of the nonaqueous electrolyte secondary battery is substantially 0 V; and a second charge control portion that calculates, after the initial current set processing is performed by the first charge control portion, the feed amount of the charge current so that the current value decreases as the terminal voltage detected by the voltage detection portion increases until the terminal voltage detected by the voltage detection portion reaches an end voltage, which is the terminal voltage across the nonaqueous electrolyte secondary battery when the negative electrode potential of the nonaqueous electrolyte secondary battery is substantially 0 V, and makes a notification and/or a request about the calculated feed amount to the charger.

According to this configuration, in a case where the battery pack according to one aspect of the invention is charged by connecting it to the charger that outputs a charge current for charging a nonaqueous electrolyte secondary battery according to a request from the outside, deterioration of the battery characteristic can be reduced while shortening the charge time of the nonaqueous electrolyte secondary battery equipped to the battery pack.

In particular, when the invention is used for a battery pack formed by connecting a plurality of cells in series and configured to detect the voltage across each cell, a feed amount of the charge current can be calculated while monitoring the voltages of individual cells to make a notification and/or a request to the charge control portion in the charger. This configuration is suitable because deterioration of the battery characteristic can be reduced more accurately while shortening the charge time.

INDUSTRIAL APPLICABILITY

The invention can be used suitably as a charging system used in an electronic device, such as a portable personal computer, a digital camera, and a mobile phone, a battery-mounted device, such as vehicles represented by an electric car and a hybrid car, a battery pack used as the power supply of these battery-mounted devices, and a charger that charges such a battery pack.

The invention claimed is:

1. A charging system, comprising:
a nonaqueous electrolyte secondary battery;
a charge current feed portion that feeds a charge current to the nonaqueous electrolyte secondary battery;
a voltage detection portion that detects a terminal voltage across the nonaqueous electrolyte secondary battery;
a first charge control portion that performs initial current set processing by which the charge current feed portion is controlled to feed, as a feed amount of the charge current by the charge current feed portion, the charge current at a first current value exceeding a reference current value preset as a current value of the charge current at which the charge current is flown without causing any deterioration in the nonaqueous electrolyte secondary battery while negative electrode potential of the nonaqueous electrolyte secondary battery is substantially 0 V; and
a second charge control portion that causes, after the initial current set processing is performed by the first charge control portion, the feed amount of the charge current by the charge current feed portion to change so that the current value decreases as the terminal voltage detected by the voltage detection portion increases until the terminal voltage detected by the voltage detection portion reaches an end voltage, which is the terminal voltage across the nonaqueous electrolyte secondary battery when the negative electrode potential of the nonaqueous electrolyte secondary battery is substantially 0 V.

2. The charging system according to claim 1, wherein:
the second charge control portion maintains the feed amount of the charge current by the charge current feed portion at the reference current value after the feed amount of the charge current is reduced to the reference current value until the terminal voltage detected by the voltage detection portion reaches the end voltage.

3. The charging system according to claim 1, wherein:
the second charge control portion sets the feed amount of the charge current by the charge current feed portion to the reference current value in a case where the terminal voltage detected by the voltage detection portion has become as high as or higher than a first threshold value voltage preset to a value falling short of the end voltage.

4. The charging system according to claim 2, wherein:
the second charge control portion sets the feed amount of the charge current by the charge current feed portion to the reference current value in a case where the terminal voltage detected by the voltage detection portion has become as high as or higher than a first threshold value voltage preset to a value falling short of the end voltage.

5. The charging system according to claim 3, wherein:
the second charge control portion further sets, in a case where the terminal voltage detected by the voltage detection portion becomes a voltage as high as or higher than a second threshold value voltage preset to a value falling short of the first threshold value voltage and less than the first threshold value voltage, the feed amount of the charge current by the charge current feed portion to a second current value preset to a value falling short of the first current value and exceeding the reference current value.

6. The charging system according to claim 1, wherein:
the second charge current control portion further starts, when the terminal voltage detected by the voltage detection portion has reached the end voltage, constant voltage charge by which the feed amount of the charge current by the charge current feed portion is kept reduced so that the terminal voltage detected by the voltage detection portion maintains the end voltage.

7. A charger, comprising:
a connection terminal that is connected to a nonaqueous electrolyte secondary battery;
a charge current feed portion that feeds a charge current for charging the nonaqueous electrolyte secondary battery to the connection terminal;
a voltage detection portion that detects a terminal voltage across the nonaqueous electrolyte secondary battery connected to the connection terminal;
a first charge control portion that performs initial current set processing by which the charge current feed portion is controlled to feed, as a feed amount of the charge current by the charge current feed portion, the charge current at a first current value exceeding a reference current value preset as a current value of the charge current at which the charge current is flown without causing deterioration in the nonaqueous electrolyte secondary battery while negative electrode potential of the nonaqueous electrolyte secondary battery is substantially 0 V; and
a second charge control portion that causes, after the initial current set processing is performed by the first charge control portion, the feed amount of the charge current by the charge current feed portion to change so that the current value decreases as the terminal voltage detected by the voltage detection portion increases until the terminal voltage detected by the voltage detection portion reaches an end voltage, which is the terminal voltage across the nonaqueous electrolyte secondary battery when the negative electrode potential of the nonaqueous electrolyte secondary battery is substantially 0 V.

8. A battery pack connected to a charger that outputs a charge current for charging a nonaqueous electrolyte secondary battery according to a request from an outside, comprising:
a nonaqueous electrolyte secondary battery;
a voltage detection portion that detects a terminal voltage across the nonaqueous electrolyte secondary battery;
a first charge control portion that performs initial current set processing by which a command is issued to the charger to set a feed amount of the charge current to a first current value exceeding a reference current value preset as a current value of the charge current at which the charge current is flown without causing deterioration in the nonaqueous electrolyte secondary battery while negative electrode potential of the nonaqueous electrolyte secondary battery is substantially 0 V; and
a second charge control portion that calculates, after the initial current set processing is performed by the first charge control portion, the feed amount of the charge current so that the current value decreases as the terminal voltage detected by the voltage detection portion increases until the terminal voltage detected by the voltage detection portion reaches an end voltage, which is the terminal voltage across the nonaqueous electrolyte secondary battery when the negative electrode potential of the nonaqueous electrolyte secondary battery is substantially 0 V, and makes a notification and/or a request about the calculated feed amount to the charger.

9. The battery pack according to claim 8, wherein:
the battery pack is formed by connecting a plurality of cells in series; and
the voltage detection portion is configured to detect a voltage across each cell.

* * * * *